US010865828B2

(12) United States Patent
Tamura et al.

(10) Patent No.: US 10,865,828 B2
(45) Date of Patent: Dec. 15, 2020

(54) OIL-IMPREGNATED SINTERED BEARING

(71) Applicant: Diamet Corporation, Niigata (JP)

(72) Inventors: Yoshiki Tamura, Niigata (JP); Shinichi Takezoe, Niigata (JP)

(73) Assignee: Diamet Corporation, Niigata (JP)

( * ) Notice: Subject to any disclaimer, the term of this patent is extended or adjusted under 35 U.S.C. 154(b) by 0 days.

(21) Appl. No.: 16/335,532

(22) PCT Filed: Oct. 26, 2017

(86) PCT No.: PCT/JP2017/038745
§ 371 (c)(1),
(2) Date: Mar. 21, 2019

(87) PCT Pub. No.: WO2018/079670
PCT Pub. Date: May 3, 2018

(65) Prior Publication Data
US 2020/0016662 A1  Jan. 16, 2020

(30) Foreign Application Priority Data
Oct. 26, 2016  (JP) .................................. 2016-209695

(51) Int. Cl.
*F16C 17/02* (2006.01)
*F16C 33/10* (2006.01)
(Continued)

(52) U.S. Cl.
CPC ................ *F16C 17/02* (2013.01); *B22F 5/10* (2013.01); *F16C 33/10* (2013.01); *F16C 33/12* (2013.01)

(58) Field of Classification Search
CPC .......... F16C 17/02; F16C 33/10; F16C 33/12; F16C 33/121; F16C 33/128; F16C 2204/60
See application file for complete search history.

(56) References Cited

U.S. PATENT DOCUMENTS 6,505,971 B2    1/2003  Sugimoto et al.
7,387,444 B2 *  6/2008  Shimizu ................ F16C 23/041
                                                          384/279
(Continued)

FOREIGN PATENT DOCUMENTS

CN        1768208 A    5/2006
CN      101203343 A    6/2008
(Continued)

OTHER PUBLICATIONS

Translation of JP07-238932 obtained Aug. 4, 2020.*
(Continued)

*Primary Examiner* — James Pilkington
(74) *Attorney, Agent, or Firm* — Leason Ellis LLP

(57) ABSTRACT

An oil-impregnated sintered bearing in which a Fe—Cu-based sintered body is impregnated with a lubricant and which has a bearing hole that is configured to support a rotary shaft inserted therethrough, in which an inner circumferential surface of the bearing hole includes at least a first region including a central portion in a shaft direction and a second region forming a portion from a first end portion of the first region to a first opening of the bearing hole, and, in a friction surface of the second region, an area of a Fe phase is larger and an area of a Cu phase formed of Cu powder including Cu-based flat raw material powder is smaller than those in a friction surface of the first region.

8 Claims, 8 Drawing Sheets

(51) Int. Cl.
   *F16C 33/12*   (2006.01)
   *B22F 5/10*   (2006.01)

(56) References Cited

U.S. PATENT DOCUMENTS

| | | | |
|---|---|---|---|
| 2007/0041672 A1* | 2/2007 | Maruyama | F16C 33/145 |
| | | | 384/279 |
| 2018/0112712 A1* | 4/2018 | Yamashita | B22F 3/24 |

FOREIGN PATENT DOCUMENTS

| | | |
|---|---|---|
| EP | 1878521 A1 | 1/2008 |
| JP | 07-238932 A | 9/1995 |
| JP | 08-019941 B | 3/1996 |
| JP | 2004-308682 A | 11/2004 |
| JP | 2005-344868 A | 12/2005 |
| JP | 2006-299347 A | 11/2006 |
| JP | 2007-247810 A | 9/2007 |
| JP | 2008-240908 A | 10/2008 |
| JP | 2008-240910 A | 10/2008 |
| JP | 2010-077474 A | 4/2010 |
| JP | 4573349 B | 11/2010 |
| WO | WO-2016/147925 A1 | 9/2016 |
| WO | WO-2016/152474 A1 | 9/2016 |

OTHER PUBLICATIONS

International Search Report dated Jan. 30, 2018 for the corresponding PCT International Patent Application No. PCT/JP2017/038745.
Chinese Office Action dated Dec. 12, 2019 for the corresponding Chinese Patent Application No. 201780064404.9.
European Search Report dated Jun. 24, 2020 for the corresponding European Patent Application No. 17863566.0.

* cited by examiner

US 10,865,828 B2

OIL-IMPREGNATED SINTERED BEARING

CROSS-REFERENCE TO RELATED PATENT APPLICATIONS

This application is a U.S. National Phase Application under 35 U.S.C. § 371 of International Patent Application No. PCT/JP2017/038745, filed Oct. 26, 2017, and claims the benefit of Japanese Patent Application No. 2016-209695, filed on Oct. 26, 2016, all of which are incorporated herein by reference in their entirety. The International Application was published in Japanese on May 3, 2018 as International Publication No. WO/2018/079670 under PCT Article 21(2).

FIELD OF THE INVENTION

The present invention relates to an oil-impregnated sintered bearing having a bearing main body formed of a Fe—Cu-based sintered metal.

BACKGROUND OF THE INVENTION

In an oil-impregnated sintered bearing, the inside of a sintered body is impregnated with a lubricant, the oil is caused to flow out by a pumping action by the rotation of a shaft and thermal expansion by friction heat, and a friction surface is lubricated. Such oil-impregnated sintered bearings can be used for a long period of time with no refueling and are thus being broadly employed as bearings for rotary shafts for automobiles, home appliances, acoustic devices, and the like (for example, refer to Japanese Examined Patent Application, Second Publication No. H8-19941).

In the case of supporting a rotary shaft using an oil-impregnated sintered bearing of the related art, for example, when a torque is transmitted to rotate the rotary shaft in a certain direction, a load in a shear direction is applied to the rotary shaft. At this time, when the shear load is extremely large or the stiffness of the rotary shaft is not high enough, the rotary shaft bends due to the shear load, rotates with the shaft line inclined inside the bearing, and there is a possibility that a state in which the surface of the rotary shaft does not properly come into contact with the friction surface inside the bearing (a motion of the rotary shaft hollowing the inner wall of the bearing) may be caused. When such a state is caused, the rotary shaft receives a strong resistance and is not capable of readily rotating, and the bearing does not sufficiently perform the function. In addition, when such a state is repeatedly caused, it can be also considered that the durability of the rotary shaft or the bearing degrades.

In order to solve the disadvantage of the rotary shaft incapable of properly coming into contact with the friction surface inside the bearing in the case of receiving a load in a shear direction as described above, for example, an oil-impregnated sintered bearing including a straight hole portion having a constant diameter and a diameter expansion portion having a diameter that increases outwards and forming a tapered shape in a bearing hole is known (for example, refer to Japanese Unexamined Patent Application, First Publication No. 2004-308682).

A majority of oil-impregnated sintered bearings are formed of an iron (Fe)-copper (Cu)-based sintered metal. The Fe component is suitable for an operation state in which the rotation speed of the rotary shaft is slow and the load being applied to the rotary shaft is high (slow rotation and high load state). On the other hand, the Cu component is suitable for an operation state in which the rotation speed of the rotary shaft is fast and the load being applied to the rotary shaft is low (fast rotation and low load state).

In response to the recent increase in resource prices, particularly, a price increase of Cu, there has been a demand for additional cost reduction of products including Cu, which has created another demand for oil-impregnated sintered bearings capable of dealing with the fast rotation speed of rotary shafts while decreasing the amount of Cu used. As oil-impregnated sintered bearings for which the amount of Cu used is decreased, Fe—Cu-based sintered metal bearings for which Cu-based flat raw material powder is used are being broadly used (for example, refer to Japanese Unexamined Patent Application, First Publication No. 2006-299347).

Technical Problem

As described above, for oil-impregnated sintered bearings, it is common to use a Cu-based sintered material in consideration of the seizure properties with shafts in the low load and fast operation region and use a Fe-based sintered material having abrasion resistance strong enough to withstand high loads in the high load and slow operation region. Due to the current diversification of the operation region of actuators, a single actuator covers the low load and fast operation region through the high load and slow operation region with increasing frequency, and proposals for oil-impregnated sintered bearings capable of dealing with both operation regions have been in demand.

The present invention has been made in consideration of the above-described circumstances, and an object of the present invention is to provide an oil-impregnated sintered bearing for which a Fe—Cu-based sintered metal is used and which is capable of enhancing both bearing performance for rotary shafts in a high load state and bearing performance for rotary shafts in a fast rotation state to the maximum extent and is capable of obtaining stabilized sliding properties.

SUMMARY OF THE INVENTION

Solution to Problem

That is, an oil-impregnated sintered bearing of the present invention has the following configuration.

An oil-impregnated sintered bearing in which a Fe—Cu-based sintered body is impregnated with a lubricant and a bearing hole that is configured to support a rotary shaft inserted therethrough, in which an inner circumferential surface of the bearing hole includes at least a first region including a central portion in a shaft direction and a second region forming a portion from a first end portion of the first region to a first opening of the bearing hole, and, in a friction surface of the second region, an area of a Fe phase is larger and an area of a Cu phase formed of Cu powder including Cu-based flat raw material powder is smaller than those in a friction surface of the first region.

According to the oil-impregnated sintered bearing of the present invention, when a relatively small torque is exerted to rotate the rotary shaft, the rotary shaft seldom bends, and thus a surface of the rotary shaft comes into contact with the first region and the second region, and the contact portions are supported as the friction surfaces. In the friction surface of the first region, the area of the Fe phase is smaller and the area of the Cu phase is larger than those in the friction surface of the second region, and thus, in a case where the rotary shaft comes into contact with the first region without bending, it is possible to rotate the rotary shaft at a high speed (fast rotation). That is, the Cu component in the Fe—Cu-based sintered metal is suitable for an operation state in which the rotation speed of the rotary shaft is fast and the load being applied to the rotary shaft is low, and thus, when the area of the Cu phase in the first region is increased to be larger than that in the second region, the function of the bearing is not impaired, and the durability also does not degrade even when the rotary shaft is rotated at a high speed.

On the other hand, when a large torque is transmitted to rotate the rotary shaft, a shear load being exerted on the rotary shaft is high, and the rotary shaft is shaft-supported with a shaft line inclined inside a bearing main body. At this time, the surface of the rotary shaft mainly comes into contact with the second region, and the contact portion is supported as the friction surface. In the friction surface of the second region, the area of the Fe phase is larger and the area of the Cu phase is smaller than those in the friction surface of the first region, and thus, even in a case where the rotary shaft receives a large torque, bends, and comes into contact with the second region, it is possible to stably rotate the rotary shaft. That is, the Fe component in the Fe—Cu-based sintered metal is suitable for an operation state in which the rotation speed of the rotary shaft is slow and the load being applied to the rotary shaft is high, and thus, when the area of the Fe phase in the second region is increased to be larger than that in the first region, it becomes possible to stably rotate the rotary shaft even when the rotary shaft receives a high load and bends, the function of the bearing is not impaired, and the durability also does not degrade.

An area occupied by the Cu phase relative to an area of the entire friction surface of the first region is 50% or more, and an area occupied by the Cu phase relative to an area of the entire friction surface of the second region is less than 50%.

An area of the Cu phase in a central portion of the friction surface of the second region along the shaft direction is 20% or more and 70% or less of an area of the Cu phase in a central portion of the friction surface of the first region along the shaft direction.

The inner circumferential surface of the bearing hole further includes a third region forming a portion from a second end portion of the first region to a second opening of the bearing hole.

The bearing hole includes a straight hole portion having a portion that is formed in the first region and has a constant diameter and a first diameter expansion portion that is formed in the second region, continues from the straight hole portion, and has a diameter that increases outwards, to form a tapered shape.

According to the above-described oil-impregnated sintered bearing, when a relatively small torque is exerted to rotate the rotary shaft, the rotary shaft seldom bends, and thus the surface of the rotary shaft comes into contact with the straight hole portion, and this portion is supported as the friction surface. In a friction surface of the straight hole portion, the area of the Fe phase is smaller and the area of the Cu phase is larger than those in the friction surface of the first expansion portion, and thus, in a case where the rotary shaft comes into contact with the straight hole portion without bending, it is possible to rotate the rotary shaft at a high speed (fast rotation). That is, the Cu component in the Fe—Cu-based sintered metal is suitable for an operation state in which the rotation speed of the rotary shaft is fast and the load being applied to the rotary shaft is low, and thus, when the area of the Cu phase in the straight hole portion is increased to be larger than that in the first diameter expansion portion, the function of the bearing is not impaired, and the durability also does not degrade even when the rotary shaft is rotated at a high speed.

On the other hand, when a large torque is transmitted to rotate the rotary shaft, the shear load being exerted on the rotary shaft is high, and the rotary shaft is shaft-supported with the shaft line inclined inside the bearing main body. At this time, the surface of the rotary shaft mainly comes into contact with the first diameter expansion portion, and this portion is supported as the friction surface. In the friction surface of the first diameter expansion portion, the area of the Fe phase is larger and the area of the Cu phase is smaller than those in the friction surface of the straight hole portion, and thus, even in a case where the rotary shaft receives a large torque, bends, and comes into contact with the first diameter expansion portion, it is possible to stably rotate the rotary shaft. That is, the Fe component in the Fe—Cu-based sintered metal is suitable for an operation state in which the rotation speed of the rotary shaft is slow and the load being applied to the rotary shaft is high, and thus, when the area of the Fe phase in the first diameter expansion portion is increased to be larger than that in the straight hole portion, it becomes possible to stably rotate the rotary shaft even when the rotary shaft receives a high load and bends, the function of the bearing is not impaired, and the durability also does not degrade.

The bearing hole further includes a second diameter expansion portion that is formed in the third region, continues from the straight hole portion, and has a diameter that increases outwards, to form a tapered shape.

Due to the above-described second diameter expansion portion, it is possible to prevent the strong contact of the end portion of the rotary shaft to the hole bearing hole and the generation of an excess load when a large torque is transmitted to rotate the rotary shaft and the rotary shaft has the shaft line inclined inside the bearing main body.

A taper angle of the first diameter expansion portion relative to the shaft direction is equal to a taper angle of the second diameter expansion portion relative to the shaft direction.

A taper angle of the first diameter expansion portion relative to the shaft direction is different from a taper angle of the second diameter expansion portion relative to the shaft direction.

Advantageous Effects of Invention

According to the present invention, it is possible to provide an oil-impregnated sintered bearing capable of exhibiting the bearing performance to the maximum extent in each of the fast rotation and low load state and the slow rotation and high load state of the rotary shaft.

DETAILED DESCRIPTION OF THE INVENTION

Hereinafter, oil-impregnated sintered bearings that are embodiments to which the present invention is applied will be described with reference to drawings. The respective embodiments described below are specific descriptions for the better understanding of the gist of the invention, and, unless particularly otherwise described, the embodiments do not limit the present invention. In addition, drawings to be used in the following description show main portions in an enlarged or emphasized manner in some cases for convenience, and the dimensional ratios, angles, and the like of individual configurational elements are not always equal to those of actual cases.

First Embodiment

Figure 1:
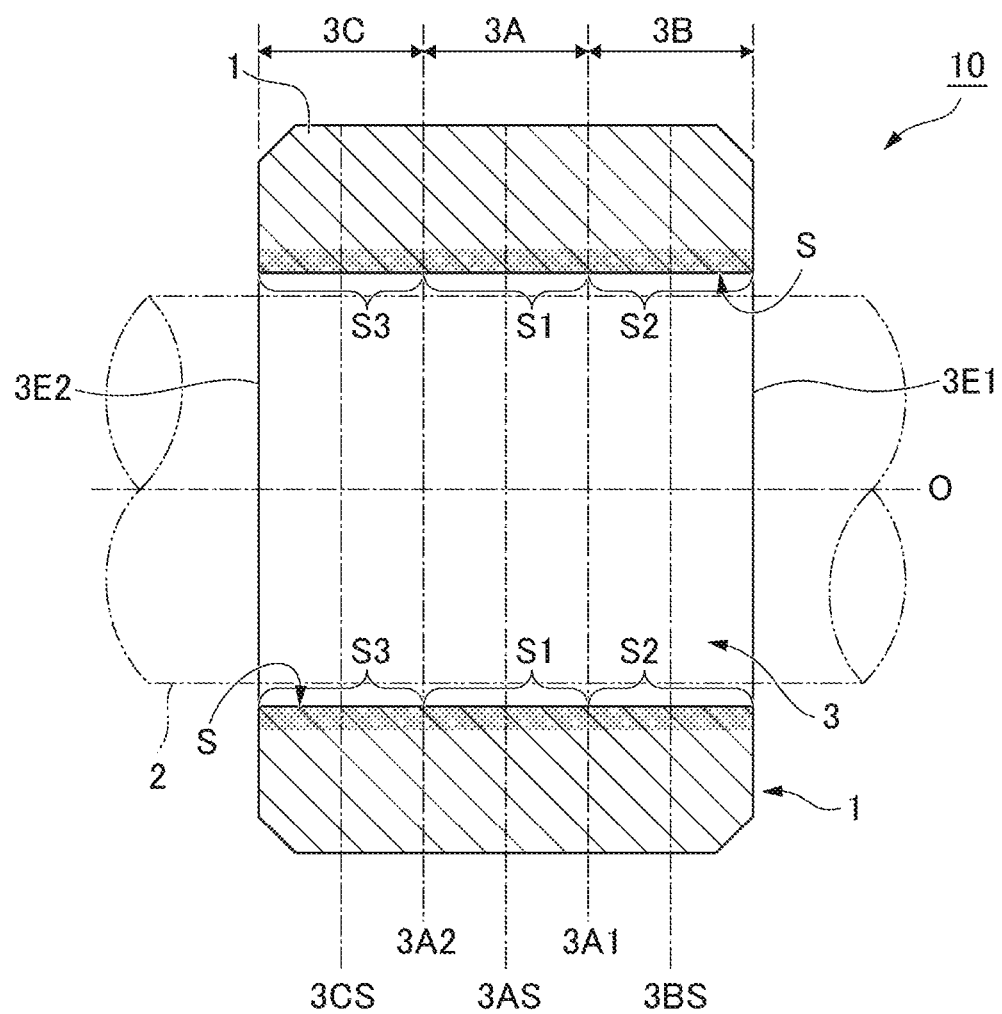
FIG. 1 is a cross-sectional view along a shaft direction of a rotary shaft which shows an oil-impregnated sintered bearing according to a first embodiment of the present invention.
Figure 2:
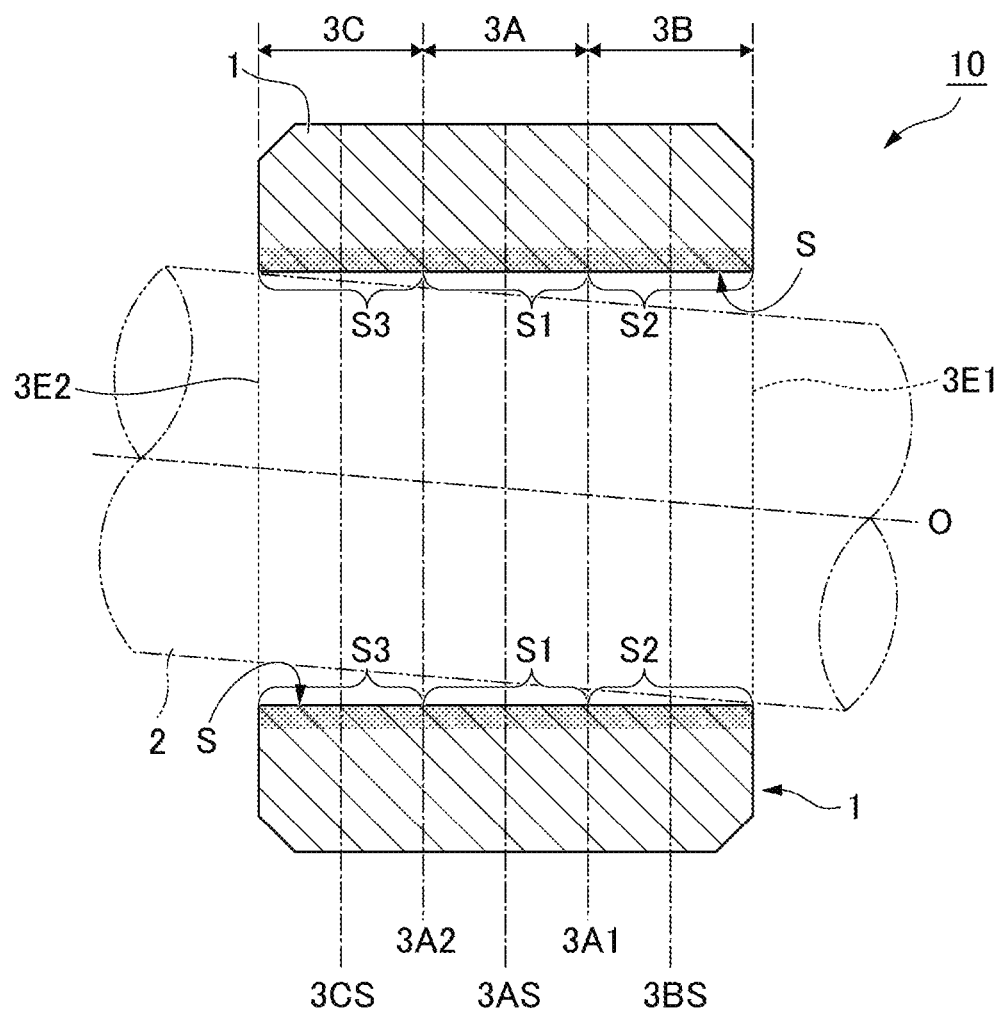
FIG. 2 is a cross-sectional view showing the oil-impregnated sintered bearing in a state in which the rotary shaft receives a load and is inclined.

An oil-impregnated sintered bearing according to a first embodiment as shown in FIG. 1 and FIG. 2 will be described.

FIG. 1 is a cross-sectional view along a shaft direction of a rotary shaft which shows the oil-impregnated sintered bearing according to the first embodiment of the present invention. FIG. 2 is a cross-sectional view showing the oil-impregnated sintered bearing in a state in which the rotary shaft receives a load and is inclined.

In an oil-impregnated sintered bearing (hereinafter, simply referred to as the bearing) 10, a bearing hole 3 into which a rotary shaft 2 is scheduled to be inserted is formed inside a bearing main body (sintered body) 1 formed of a Fe—Cu-based sintered metal.

The bearing main body (sintered body) 1 is formed of a Fe—Cu-based sintered metal (Fe—Cu-based sintered body). Specifically, Fe powder and Cu powder including Cu-based flat raw material powder are introduced into a metal die having a core rod inserted into a cavity, and a Fe—Cu-based sintered body is shaped, thereby shaping the bearing main body 1 including the bearing hole 3.

Areas occupied by a Cu phase in individual regions of the bearing main body 1 described below can be varied by changing the mixing ratio between the Fe powder and the Cu powder including the Cu-based flat raw material powder separately for each of the regions.

The cross-sectional shape of the bearing hole 3 in a surface orthogonal to a shaft line O in the longitudinal direction of the rotary shaft 2 forms a circular shape, and the inner diameter of the bearing hole is set to be constant throughout the entire length along the shaft line O. In the present invention, in an inner circumferential surface S of the bearing hole 3, a first region 3A forming a central portion along the shaft line O, a second region 3B forming a first end portion 3A1 of the first region 3A through a first opening 3E1 of the bearing hole 3, and a third region 3C forming a second end portion 3A2 of the first region 3A through a second opening 3E2 of the bearing hole 3 are set.

In the present embodiment, the first region 3A, the second region 3B, and the third region 3C set in the friction surface (inner circumferential surface) S of the bearing hole 3 are set to evenly trisect the entire length of the bearing hole 3 along the shaft line O. The first region 3A, the second region 3B, and the third region 3C can be set to divide the entire length of the bearing hole 3 along the shaft line O at any proportions.

For example, in terms of the length along the shaft line O, it is possible to set the first region 3A to be longest and set the second region 3B and the third region 3C to be shorter than the first region or, conversely, it is possible to set the first region 3A to be shortest and set the second region 3B and the third region 3C to be longer than the first region.

In addition, the bearing hole 3 may not be provided with, particularly, the third region 3C and may be only provided with the first region 3A and the second region 3B formed to bisect the friction surface (inner circumferential surface) S in a direction along the shaft line O. In this case, the first region is regarded as a region including the first opening of the bearing hole through the central portion, and the second region is regarded as a region covering the end portion opposite to the opening of the first region through the second opening of the bearing hole.

There is neither a clear compartment line nor a significant difference in composition between any two regions of the first region 3A, the second region 3B, and the third region 3C, and these regions are set for convenience to define the distributions of a Fe phase and the Cu phase along the shaft line O described below.

A friction surface S2 in the second region 3B of the bearing hole 3 is formed so that the area of the Fe phase becomes larger and the area of the Cu phase becomes smaller than those in a friction surface S1 in the first region 3A.

For example, the area occupied by the Cu phase relative to the area of the entire friction surface S1 of the first region 3A is set to 50% or more, and the area occupied by the Cu phase relative to the area of the entire friction surface S2 of the second region 3B is set to less than 50%. The area mentioned herein refers to an area excluding pores and cavities.

The area occupied by the Cu phase relative to the area of the entire friction surface S1 of the first region 3A is more preferably 60% or more and less than 100%. In addition, the area occupied by the Cu phase relative to the area of the entire friction surface S2 of the second region 3B is more preferably 10% to 40%.

The area occupied by the Cu phase relative to the area of the entire friction surface S1 of the first region 3A can be computed, for example, as described below.

First, a photograph of any places having a central portion 3AS along the shaft line O of the first region 3A in the center is captured at a magnification of 200 times. A grid frame (for example, a 2 mm-grid frame with 30 cells×40 cells) is overlaid on the captured photograph, and cells that are each occupied 50% or more by an iron matrix or a copper matrix are marked respectively. The total of the marked cells of the iron matrix and the copper matrix is regarded as the total number of marks, and the ratio of the cells of the copper matrix to the total number of marks is computed. In the present embodiment, the ratio of the cells of the copper matrix is computed as an area ratio of the Cu phase to the central portion 3AS along the shaft line O of the first region 3A.

The area ratio of the cells of the Cu phase to a central portion 3BS along the shaft line O of the second region 3B can also be computed in the same manner.

In addition, the area of the Cu phase in the central portion 3BS along the shaft line O of the friction surface S2 of the second region 3B is set to 20% or more and 70% or less and more preferably set to 30% or more and 60% or less of the area of the Cu phase to the central portion 3AS along the shaft line O of the friction surface S1 of the first region 3A.

In the first region 3A and the second region 3B, the area ratios of the Cu phase to the unit areas of at least the friction surfaces that are the respective surfaces thereof need to be in the above-described ranges, and, furthermore, a region in which the above-described area ratios of the Cu phase are maintained may extend outwards in the radial direction from the surfaces in a predetermined thickness range.

In addition, in the third region 3C, the area occupied by the Cu phase relative to the area of the entire friction surface S3 can be set to be, for example, approximately equal to or larger than that in the first region 3A. In addition, similar to the second region 3B, in the third region 3C, the area of the Fe phase may be set to be larger and the area of the Cu phase may be set to be smaller than those in the first region 3A.

The bearing 10 having the above-described configuration is used in a state in which, for example, the bearing main body 1 is impregnated with a lubricant and the rotary shaft 2 is inserted into the bearing hole 3. When a relatively small torque is exerted to rotate the rotary shaft 2, the rotary shaft 2 seldom bends, and thus the surface of the rotary shaft 2 is supported in contact with a friction surface (inner circumferential surface) S made up of the first region 3A, the second region 3B, and the third region 3C of the bearing hole 3. In addition, on the friction surface (inner circumferential surface) S, the lubricant is caused to flow out from the inside of the bearing main body 1 by a pumping action by the rotation of the rotary shaft 2 and thermal expansion by friction heat, and the friction surface is lubricated.

In the friction surface S1 of the first region 3A, the area of the Fe phase is smaller and the area of the Cu phase is larger than those in the friction surface S2 of the second region 3B, and thus, in a case where the rotary shaft 2 comes into contact with a portion including the first region 3A without bending, it is possible to rotate the rotary shaft 2 at a high speed (fast rotation). That is, the Cu component in the Fe—Cu-based sintered metal is suitable for an operation state in which the rotation speed of the rotary shaft 2 is fast and the load being applied to the rotary shaft 2 is low, and thus, even when the rotary shaft 2 is rotated at a high speed, the function of the bearing is not impaired, and the durability also does not degrade.

On the other hand, when a large torque is transmitted to rotate the rotary shaft 2, due to the bending of the rotary shaft 2, the rotary shaft is shaft-supported with the shaft line inclined inside the bearing main body 1. At this time, the surface of the rotary shaft 2 comes into contact with the second region 3B of the bearing hole 3, and this portion is supported as the friction surface S2. In the second region 3B as well, similar to the straight hole portion, the lubricant is caused to flow out from the inside of the bearing main body 1 by a pumping action by the rotation of the rotary shaft 2 and thermal expansion by friction heat, and the friction surface is lubricated.

In the friction surface S2 of the second region 3B of the bearing hole 3, the area of the Fe phase is larger and the area of the Cu phase is smaller than those in the friction surface S1 of the first region 3A, and thus, even in a case where the rotary shaft 2 receives a large torque and bends, and the rotary shaft 2 comes into contact with the friction surface S2 of the second region 3B, it is possible to stably rotate the rotary shaft 2. That is, the Fe component in the Fe—Cu-based sintered metal is suitable for an operation state in which the rotation speed of the rotary shaft 2 is slow and the load being applied to the rotary shaft 2 is high, and thus, when the area of the Fe phase in the friction surface S2 of the second region 3B of the bearing hole 3 is increased to be larger than that in the friction surface S1 of the first region 3A, it becomes possible to stably rotate the rotary shaft 2 even when the rotary shaft 2 receives a high load and bends, the function of the bearing is not impaired, and the durability also does not degrade.

Due to the above-described actions, the bearing 10 capable of exhibiting the bearing performance to the maximum extent in each of the fast rotation and low load state and the slow rotation and high load state of the rotary shaft 2 can be realized.

Second Embodiment

Figure 3:
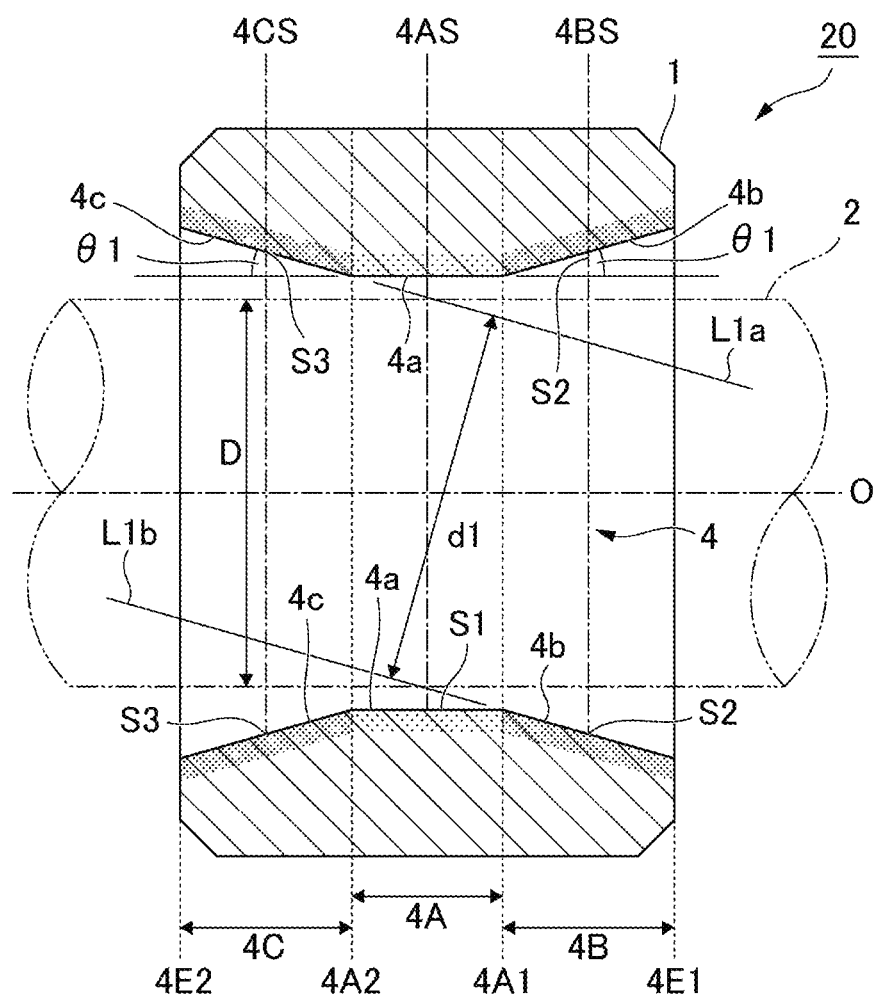
FIG. 3 is a cross-sectional view showing an oil-impregnated sintered bearing according to a second embodiment of the present invention.
Figure 4:
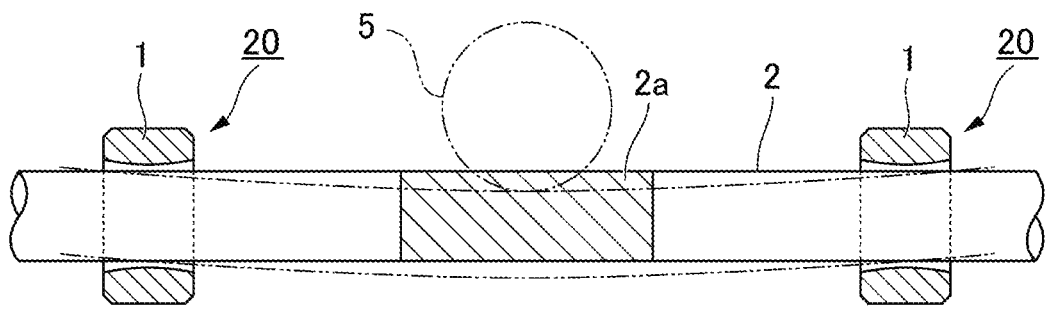
FIG. 4 is a cross-sectional view showing the oil-impregnated sintered bearing holding the rotary shaft.
Figure 5:
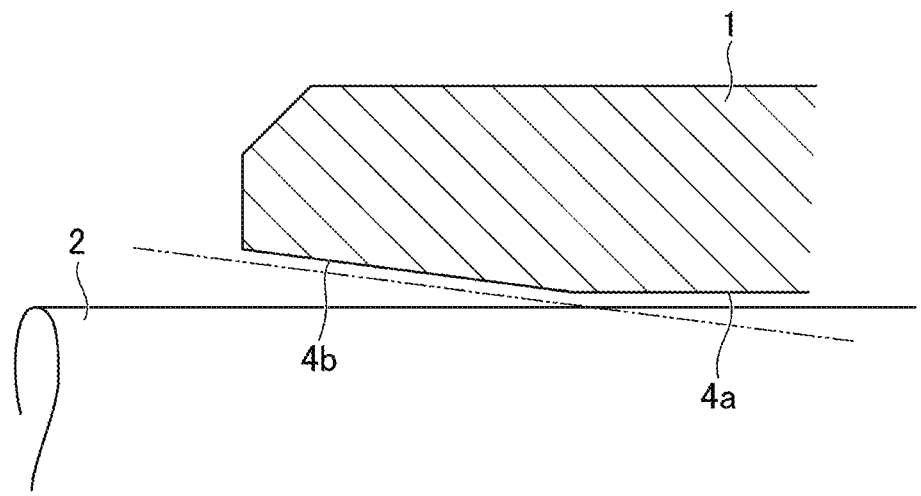
FIG. 5 is a main portion-enlarged cross-sectional view showing a main portion of the oil-impregnated sintered bearing in an enlarged manner.

An oil-impregnated sintered bearing according to a second embodiment as shown in FIG. 3 to FIG. 5 will be described.

FIG. 3 is a cross-sectional view along a shaft direction of a rotary shaft which shows the oil-impregnated sintered bearing according to the second embodiment of the present invention. In addition, FIG. 4 is a cross-sectional view showing a state in which the rotary shaft is held in the oil-impregnated sintered bearing shown in FIG. 3. In addition, FIG. 5 is a main portion-enlarged view showing a contact state between the oil-impregnated sintered bearing and the rotary shaft.

In an oil-impregnated sintered bearing (hereinafter, simply referred to as the bearing) 20, a bearing hole 4 into which the rotary shaft 2 is scheduled to be inserted is formed inside the bearing main body (sintered body) 1 formed of a Fe—Cu-based sintered metal.

The cross-sectional shape of the bearing hole 4 in a surface orthogonal to the shaft line O in the longitudinal direction of the rotary shaft 2 forms a circular shape, and, on a friction surface (inner circumferential surface) S of the bearing hole 4, a first region 4A forming a central portion along the shaft line O, a second region 4B forming a first end portion 4A1 of the first region 4A through a first opening 4E1 of the bearing hole 4, and a third region 4C forming a second end portion 4A2 of the first region 4A through a second opening 4E2 of the bearing hole 4 are set.

In the present embodiment, the first region 4A, the second region 4B, and the third region 4C set in the inner circumferential surface S of the bearing hole 4 are set to evenly trisect the entire length of the bearing hole 4 along the shaft line O. The first region 4A, the second region 4B, and the third region 4C can be set to divide the entire length of the bearing hole 4 along the shaft line O at any proportions.

In the first region 4A set on the friction surface (inner circumferential surface) S of the bearing hole 4, a straight hole portion 4a having a diameter that is slightly larger than the diameter of the rotary shaft 2 and having a diameter that is constant at any location in the longitudinal direction is formed. In addition, in the second region 4B and the third region 4C, a first diameter expansion portion 4b and a second diameter expansion portion 4c that are provided continuously from the straight hole portion 4a on both sides in the longitudinal direction respectively, have a diameter that monotonously increases outwards, and form a tapered shape are formed respectively. In both of the first diameter expansion portion 4b and the second diameter expansion portion 4c, an angle (taper angle) θ1 formed by an inclined surface of the diameter expansion portion and an inner surface of the straight hole portion 4a (or the shaft line O of the rotary shaft 2) parallel to the shaft direction of the bearing main body 1 is set to any angles, for example, approximately 0.1° to 10°. This angle is preferably set in accordance with the bending angle of a shaft that is scheduled to be a sliding object. In FIG. 3, the angle is shown in the drawing in an exaggerated manner in order to clarify θ1.

When the bearing main body 1 is seen on a cross section along the shaft line O of the rotary shaft 2 (refer to FIG. 3), regarding the two diameter expansion portions 4b and 4c present across the straight hole portion 4a, a straight line L1a extended from the inclined surface of the first diameter expansion portion 4b in an inclination direction toward the center of the bearing main body 1 and a straight line L1b extended from the inclined surface of the second diameter expansion portion 4c located at the opposite corner in an inclination direction toward the center of the bearing main body 1 are disposed parallel to each other, and an interval d1 between both straight lines L1a and L1b is slightly larger than a diameter D of the rotary shaft 2 and almost equal to an inner diameter of the straight hole portion 4a.

In other words, the straight line L1a extended from the inclined surface on an upper end side of the first diameter expansion portion 4b in the inclination direction toward the center of the bearing main body 1 and the straight line L1b extended from the inclined surface on a lower end side of the second diameter expansion portion 4c in the inclination direction toward the center of the bearing main body 1 have a parallel relationship, and the interval d1 between both straight lines L1a and L1b is slightly larger than the diameter D of the rotary shaft 2 and almost equal to the inner diameter of the straight hole portion 4a.

The entire bearing main body (sintered body) 1 is formed of a Fe—Cu-based sintered metal (Fe—Cu-based sintered body). Specifically, Fe powder and Cu powder formed of Cu powder including Cu-based flat raw material powder are introduced to a shaping die, a Fe—Cu-based sintered body including a through-hole is formed, and the diameter of the through-hole in the sintered body is expanded up to a predetermined depth on both sides by sizing, thereby forming the bearing main body 1 including the straight hole portion 4a and the diameter expansion portions 4b and 4c.

The first diameter expansion portion 4b is formed so that, in the friction surface (inner circumferential surface) S forming the surface of the first diameter expansion portion which comes into contact with the rotary shaft 2, the area of a Fe phase configuring the Fe—Cu-based sintered metal becomes larger and the area of a Cu phase becomes smaller than those in the friction surface of the straight hole portion 4a.

For example, the area occupied by the Cu phase relative to the area of the entire friction surface S2 of the first diameter expansion portion 4b is set to less than 50%. In addition, the area occupied by the Cu phase relative to the area of the entire friction surface of the straight hole portion 4a is set to 50% or more.

The area occupied by the Cu phase relative to the area of the entire friction surface S2 of the first diameter expansion portion 4b is more preferably 10% to 40%. In addition, the area occupied by the Cu phase relative to the area of the entire friction surface of the straight hole portion 4a is more preferably 60% to less than 100%.

In addition, the area of the Cu phase in a central portion 4BS along the shaft direction (shaft line O) of the friction surface of the first diameter expansion portion 4b is set to 20% or more and 90% or less and more preferably 30% or more and 60% or less of the area of the Cu phase in a central portion 4AS along the shaft direction of the friction surface of the straight hole portion 4a.

The areas of the Fe phase and the Cu phase can be made to differ in the straight hole portion 4a and the first diameter expansion portion 4b as described above by, in the formation of the sintered body made of the Fe—Cu-based sintered metal, selectively collecting Cu near the surface of the metal die wall by moving the metal die during the introduction of the Fe powder and the Cu powder formed of Cu powder including Cu-based flat raw material powder which are raw materials to the shaping die.

In the straight hole portion 4a and the first diameter expansion portion 4b, the area ratios of the Fe phase and the Cu phase need to differ in at least the friction surfaces that are the respective surfaces thereof, and, furthermore, regions in which the area ratios of the Fe phase and the Cu phase differ may extend from the respective friction surfaces toward the center in the radial direction in a predetermined thickness.

In addition, in the second diameter expansion portion 4c, the area occupied by the Cu phase relative to the area of the entire friction surface S3 can be set to be, for example, approximately equal to or larger than that in the straight hole portion 4a.

The bearing 20 having the above-described configuration is used in a state in which, for example, the bearing main body 1 is impregnated with a lubricant and the rotary shaft 2 is inserted into the bearing hole 3. FIG. 4 shows an example of a mechanism that is configured to support the rotary shaft 2 at two places using the bearings. In this mechanism, a screw gear 2a is formed on a circumferential surface of the rotary shaft 2, both ends of the rotary shaft 2 are supported by the bearings, a screw gear 5 that is configured to be rotary-driven by a driving device, not shown, is engaged with the screw gear 2a on the rotary shaft 2 side, and the rotary shaft 2 is rotated by rotating the screw gear 5. In actual cases, the rotary shaft 2 does not bend as much as shown in FIG. 4; however, here, the bending is shown in an exaggerated manner in order to clarify the gist of the description.

When a relatively small torque is exerted to rotate the rotary shaft 2, the rotary shaft 2 seldom bends, and thus the surface of the rotary shaft 2 comes into contact with the straight hole portion 4a, and this portion is supported as the friction surface S1. In the straight hole portion 4a, the lubricant is caused to flow out from the inside of the bearing main body 1 by a pumping action by the rotation of the rotary shaft 2 and thermal expansion by friction heat, and the friction surface S1 is lubricated.

In the friction surface S1 of the straight hole portion 4a, the area of the Fe phase is smaller and the area of the Cu phase is larger than those in the friction surface S2 of the first diameter expansion portion 4b, and thus, in a case where the rotary shaft 2 comes into contact with the straight hole portion 4a without bending, it is possible to rotate the rotary shaft 2 at a high speed (fast rotation). That is, the Cu component in the Fe—Cu-based sintered metal is suitable for an operation state in which the rotation speed of the rotary shaft 2 is fast and the load being applied to the rotary shaft 2 is low, and thus, when the area of the Cu phase in the straight hole portion 4a is increased relative to the first diameter expansion portion 4b, the function of the bearing is not impaired, and the durability also does not degrade even when the rotary shaft 2 is rotated at a high speed.

On the other hand, when a large torque is transmitted to rotate the rotary shaft 2, a shear load exerted on the rotary shaft 2 is high, the rotary shaft 2 is strongly vibrated, and misalignment is likely to occur. At this time, the vibration generated in the rotary shaft 2 causes the lubricant that lubricates the rotary shaft 2 and the straight hole portion 4*a* to be pushed out toward the first diameter expansion portion 4*b* and loaded into the space between the rotary shaft 2 and the first diameter expansion portion 4*b*. The lubricant loaded into the space between the rotary shaft 2 and the first diameter expansion portion 4*b* is pressurized by the vibration of the rotary shaft 2 so as to be pressed against the first diameter expansion portion 4*b*, but the first diameter expansion portion 4*b* has been formed to be dense, and thus the lubricant is not pressed into the inside of the bearing main body 1, instead, remains between the rotary shaft 2 and the first diameter expansion portion 4*b*, and exerts a repulsive force on the rotary shaft 2. This repulsive force suppresses the vibration of the rotary shaft 2 and prevents the misalignment of the rotary shaft 2 relative to the bearing.

However, in a case where the shear load exerted on the rotary shaft 2 is extremely high and the push-back action of the lubricant remaining between the rotary shaft 2 and the first diameter expansion portion 4*b* does not sufficiently function, the rotary shaft 2 is shaft-supported with the shaft line inclined inside the bearing main body 1. At this time, the surface of the rotary shaft 2 comes into contact with the first diameter expansion portion 4*b*, and this portion is supported as the friction surface S2. In the first diameter expansion portion 4*b* as well, similar to the straight hole portion 4*a*, the lubricant is caused to flow out from the inside of the bearing main body 1 by a pumping action by the rotation of the rotary shaft 2 and thermal expansion by friction heat, and the friction surface S2 is lubricated.

In the friction surface S2 of the first diameter expansion portion 4*b*, the area of the Fe phase is larger and the area of the Cu phase is smaller than those in the friction surface S1 of the straight hole portion 4*a*, and thus, even in a case where the rotary shaft 2 receives a large torque, bends, and comes into contact with the first diameter expansion portion 4*b*, it is possible to stably rotate the rotary shaft 2. That is, the Fe component in the Fe—Cu-based sintered metal is suitable for an operation state in which the rotation speed of the rotary shaft 2 is slow and the load being applied to the rotary shaft 2 is high, and thus, when the area of the Fe phase in the first diameter expansion portion 4*b* is increased to be larger than that in the straight hole portion 4*a*, it becomes possible to stably rotate the rotary shaft 2 even when the rotary shaft 2 receives a high load and bends, the function of the bearing is not impaired, and the durability also does not degrade.

In the present embodiment, in the friction surface of the first diameter expansion portion 4*b*, the area of the Fe phase is set to be larger and the area of the Cu phase is set to be smaller than those in the friction surface of the straight hole portion 4*a*. Generally, in a configuration as shown in FIG. 4, in a case where a large torque is exerted on a vicinity of the center of the rotary shaft 2 and the rotary shaft bends, the rotary shaft 2 is more strongly pressed against the portion closer to the center of the rotary shaft 2, that is, the first diameter expansion portion 4*b* than the second diameter expansion portion 4*c*. Therefore, it is also effective to configure only the first diameter expansion portion 4*b* so as to have a larger area of the Fe phase and a smaller area of the Cu phase than those in the straight hole portion 4*a*.

In addition, the areas of the Fe phase may be set to be larger and the areas of the Cu phase may be set to be smaller in both the first diameter expansion portions 4*b* and the second diameter expansion portions 4*c* of the bearings 20 and 20 that respectively support a first end side and a second end side of the rotary shaft 2 than those in the straight hole portion 4*a*.

Third Embodiment

Figure 6:
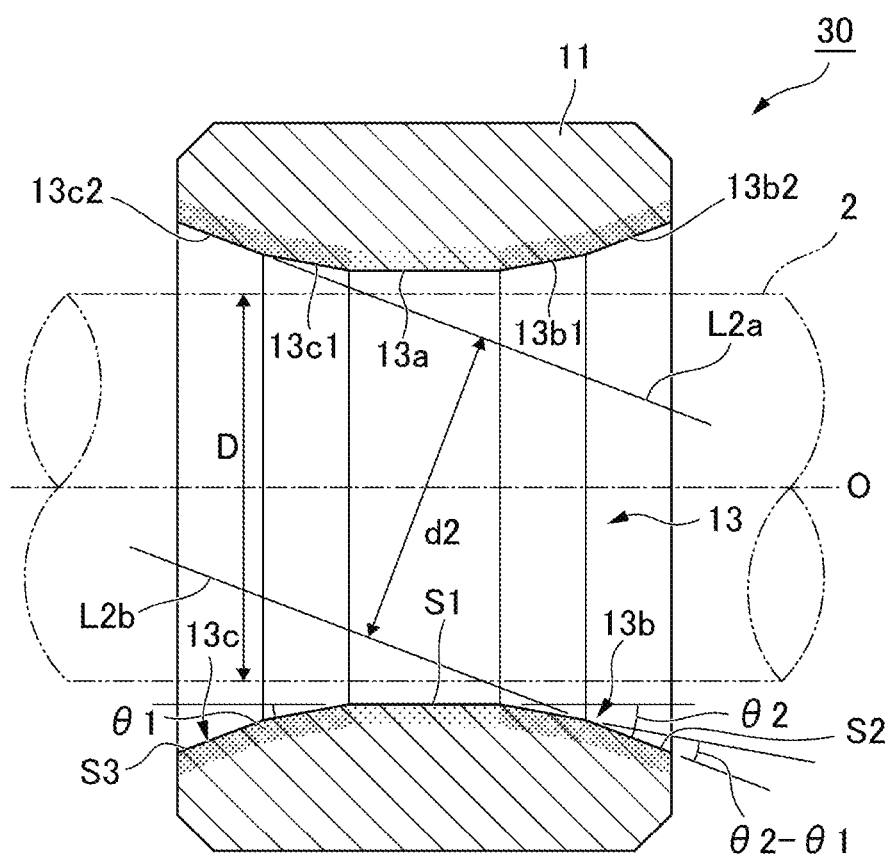
FIG. 6 is a cross-sectional view showing the oil-impregnated sintered bearing according to the second embodiment of the present invention.

An oil-impregnated sintered bearing according to a third embodiment as shown in FIG. 6 will be described.

FIG. 6 is a cross-sectional view along a shaft direction of a rotary shaft showing the oil-impregnated sintered bearing according to the third embodiment of the present invention.

In a bearing 30 shown in FIG. 6, a bearing hole 13 formed inside the bearing main body (sintered body) 11 formed of a sintered metal has a circular shape as the cross-sectional shape in a surface orthogonal to the shaft line O in the longitudinal direction of the rotary shaft 2 and includes a straight hole portion 13*a* that is present in almost the center of the bearing main body 11, has a diameter that is slightly larger than the diameter of the rotary shaft 2, and has a diameter that is constant at any location in the longitudinal direction and a first diameter expansion portion 13*b* and a second diameter expansion portion 13*c* that are provided continuously from the straight hole portion 13*a* on both sides in the longitudinal direction respectively.

The first diameter expansion portion 13*b* and the second diameter expansion portion 13*c* are made up of first diameter expansion regions 13*b*1 and 13*c*1 and second diameter expansion regions 13*b*2 and 13*c*2 respectively which have taper angles relative to an inner surface of the straight hole portion 13*a* (or the shaft line O of the rotary shaft 2) parallel to the shaft direction of the bearing main body 1 that are varied stepwise. Taper angles θ2 of the second diameter expansion regions 13*b*2 and 13*c*2 present at locations far from the straight hole portion 13*a* are formed to be larger than taper angles θ1 of the first diameter expansion regions 13*b*1 and 13*c*1.

When the bearing main body 11 is seen on a cross section along the shaft line O of the rotary shaft 2 (refer to FIG. 6), regarding the two second diameter expansion regions 13*b*2 and 13*c*2 present outside the first diameter expansion regions 13*b*1 and 13*c*1, an interval d2 between a straight line L2*b* extended from the inclined surface of the second diameter expansion region 13*b*2 of the first diameter expansion portion 13*b* toward the center of the bearing main body 11 and a straight line L2*a* extended from the inclined surface of the second diameter expansion region 13*c*2 of the second diameter expansion portion 13*c* located at the opposite corner toward the center of the bearing main body 11 is larger than the diameter D of the rotary shaft 2 and almost equal to an inner diameter of the straight hole portion 13*a*.

In other words, the straight line L2*b* extended from the inclined surface on a lower end side of the second diameter expansion region 13*b*2 of the first diameter expansion portion 13*b* in an inclination direction toward the center of the bearing main body 11 and the straight line L2*a* extended from the inclined surface on an upper end side of the second diameter expansion region 13*c*2 of the second diameter expansion portion 13*c* in an inclination direction toward the center of the bearing main body 11 have a parallel relationship, and the interval d2 between both straight lines L2*b* and L2*a* is slightly larger than the diameter D of the rotary shaft 2 and almost equal to the inner diameter of the straight hole portion 13*a*.

The entire bearing main body 11 is formed of a Fe—Cu-based sintered metal. Specifically, Fe powder and Cu powder formed of Cu powder including Cu-based flat raw material powder are introduced to a shaping die, a Fe—Cu-based sintered body including a through-hole is formed, and the diameter of the through-hole in the sintered body is expanded up to a predetermined depth on both sides by sizing, thereby forming the bearing main body 11 including the straight hole portion 13a and the diameter expansion portions 13b and 13c.

The first diameter expansion portion 13b is formed so that, in the friction surface S2 forming the surface of the first diameter expansion portion which comes into contact with the rotary shaft 2, the area of a Fe phase configuring the Fe—Cu-based sintered metal becomes larger and the area of a Cu phase becomes smaller than those in the friction surface S1 of the straight hole portion 13a.

For example, the area occupied by the Cu phase relative to the area of the entire friction surface of the first diameter expansion portion 13b is set to less than 50%. In addition, the area occupied by the Cu phase relative to the area of the entire friction surface of the straight hole portion 13a is set to 50% or more.

The area occupied by the Cu phase relative to the area of the entire friction surface of the first diameter expansion portion 13b is more preferably 10% to 40%. In addition, the area occupied by the Cu phase relative to the area of the entire friction surface of the straight hole portion 13a is more preferably 60% to less than 100%.

In the above-described bearing 30, in a case where the degree of the torque that is transmitted to the rotary shaft 2 varies, the amount of bending of the rotary shaft 2 changes in proportion to the degree of the torque, and the inclination angle of the rotary shaft 2 inside the bearing also changes. In the above-described bearing, when the rotary shaft 2 is rotated by transmitting a relatively small torque, the rotary shaft 2 bends slightly and the surface of the rotary shaft 2 comes into contact with the first diameter expansion region 13b1 having a small taper angle. In addition, when the rotary shaft 2 is rotated by transmitting a large torque, the rotary shaft 2 bends significantly and the surface of the rotary shaft 2 comes into contact with the second diameter expansion region 13b2 having a large taper angle.

In the friction surface S2 of the first diameter expansion portion 13b, the area of the Fe phase is larger and the area of the Cu phase is smaller than those in the friction surface S1 of the straight hole portion 13a, and, thus, even in a case where the rotary shaft 2 receives a large torque and bends and the surface of the rotary shaft 2 comes into contact with the first diameter expansion region 13b1 or the second diameter expansion region 13b2, it is possible to stably rotate the rotary shaft 2. That is, the Fe component in the Fe—Cu-based sintered metal is suitable for an operation state in which the rotation speed of the rotary shaft 2 is slow and the load being applied to the rotary shaft 2 is high, and thus, when the area of the Fe phase in the first diameter expansion portion 13b is increased to be larger than that in the straight hole portion 13a, it becomes possible to stably rotate the rotary shaft 2 even when the rotary shaft 2 receives a high load and bends, the function of the bearing is not impaired, and the durability also does not degrade.

Fourth Embodiment

Figure 7:
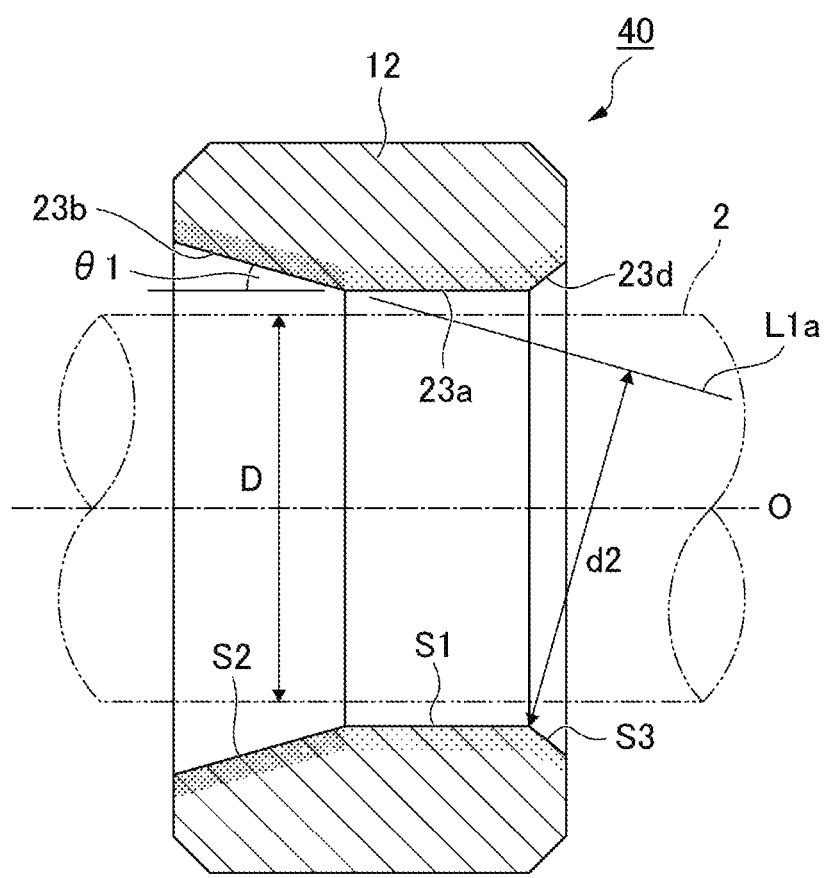
FIG. 7 is a cross-sectional view showing the oil-impregnated sintered bearing according to a third embodiment of the present invention.

An oil-impregnated sintered bearing according to a fourth embodiment as shown in FIG. 7 will be described.

FIG. 7 is a cross-sectional view along a shaft direction of a rotary shaft showing the oil-impregnated sintered bearing according to the fourth embodiment of the present invention.

In a bearing 40 of the present embodiment, a first diameter expansion portion 23b is provided only on a first side of a straight hole portion 23a, and a chamfered portion (second diameter expansion portion) 23d is provided on a second side of the straight hole portion 23a. The chamfered portion 23d is provided to facilitate the passing of the rotary shaft 2 mainly through the straight hole portion 23a and thus does not come into contact with the rotary shaft 2 regardless of how the rotary shaft 2 is dislocated from the bearing main body 30. This is because the chamfer angle of the chamfered portion 23d is greater than the inclination angle θ1 of the first diameter expansion portion 23b.

Furthermore, when a bearing main body (sintered body) 12 is seen on a cross section along the shaft line O of the rotary shaft 2, regarding the straight hole portion 23a and the first diameter expansion portion 23b, an interval d2 (corresponding to the length of a perpendicular line drawn from a straight line L1a extended from the inclined surface of the first diameter expansion portion 23b in an inclination direction toward the center of the bearing main body 12 to a terminal portion of the straight hole portion 23a that is farthest from the diameter expansion portion 23b) between the straight line L1a and a friction surface (inner circumferential surface) S1 of the straight hole portion 23a that faces an inclined friction surface (inner circumferential surface) S2 of the first diameter expansion portion 23b across the center of the bearing main body 12 is slightly larger than the diameter D of the rotary shaft 2 and almost equal to an inner diameter of the first straight hole portion 23a.

In other words, when the straight line L1a extended from the inclined surface of the first diameter expansion portion 23b in the inclination direction toward the center of the bearing main body 12 on an upper end side of the bearing main body (sintered body) 12 is imagined, the interval between the terminal portion of the straight hole portion 23a and the straight line L1a when a perpendicular line is extended from the terminal portion of the straight hole portion 23a that is on a lower end side of the bearing main body (sintered body) 12 and is connected with the chamfered portion 23d toward the straight line L1a is regarded as d2.

In the bearing having the above-described configuration, in a case where the shear load exerted on the rotary shaft 2 is extremely high and the push-back action of a lubricant remaining between the rotary shaft 2 and the diameter expansion portion 23b does not sufficiently function, the rotary shaft 2 bends and is supported by the first diameter expansion portion 23b of the bearing main body 12.

In the present embodiment as well, the entire bearing main body 12 is formed of a Fe—Cu-based sintered metal, and the first diameter expansion portion 23b is formed so that, in the friction surface S2 forming the surface of the first diameter expansion portion which comes into contact with the rotary shaft 2, the area of a Fe phase configuring the Fe—Cu-based sintered metal becomes larger and the area of a Cu phase becomes smaller than those in the friction surface S1 of the straight hole portion 23a.

For example, the area occupied by the Cu phase relative to the area of the entire friction surface S2 of the diameter expansion portion 23b is set to less than 50%. In addition, the area occupied by the Cu phase relative to the area of the entire friction surface S1 of the straight hole portion 23a is set to 50% or more.

The area occupied by the Cu phase relative to the area of the entire friction surface S2 of the diameter expansion portion 23b is more preferably 10% to 40%. In addition, the area occupied by the Cu phase relative to the area of the entire friction surface S1 of the straight hole portion 23a is more preferably 60% to less than 100%.

As described above, in the friction surface S2 of the first diameter expansion portion 23b, the area of the Fe phase is larger and the area of the Cu phase is smaller than those in the friction surface S1 of the straight hole portion 23a, and thus, even in a case where the rotary shaft 2 receives a large torque and bends and the surface of the rotary shaft 2 comes into contact with the first diameter expansion portion 23b, it is possible to stably rotate the rotary shaft 2. That is, the Fe component in the Fe—Cu-based sintered metal is suitable for an operation state in which the rotation speed of the rotary shaft 2 is slow and the load being applied to the rotary shaft 2 is high, and thus, when the area of the Fe phase in the first diameter expansion portion 23b is increased to be larger than that in the straight hole portion 23a, it becomes possible to stably rotate the rotary shaft 2 even when the rotary shaft 2 receives a high load and bends, the function of the bearing is not impaired, and the durability also does not degrade.

In addition to the above-described embodiments, it is also possible to set the taper angle relative to the shaft direction of a first diameter expansion portion of the diameter expansion portions respectively provided on both sides of the straight hole portion to be smaller than the taper angle relative to the shaft direction of a second diameter expansion portion. Even in such an embodiment, the bearing main body (sintered body) is formed of a Fe—Cu-based sintered metal, and either or both diameter expansion portions are formed so that, in the friction surface(s) of at least one diameter expansion portion or the first and second diameter expansion portions, the area of the Fe phase configuring the Fe—Cu-based sintered metal becomes larger and the area of the Cu phase becomes smaller than those in the friction surface of the straight hole portion.

Hitherto, several embodiments of the present invention have been described, but these embodiments have been presented as examples and do not intend to limit the scope of the invention. These embodiments can also be carried out in a variety of other forms and can be omitted, substituted, or modified in various manners within the scope of the gist of the invention. These embodiments and modifications thereof are included in the scope of inventions described in the claims and equivalents thereof as if the embodiments and modifications thereof are included in the scope or gist of the invention.

EXAMPLES

Verification Example 1

A preferred ratio of the area ratio occupied by the Cu phase relative to the area of the inner circumferential surface S in the first region 3A in the oil-impregnated sintered bearing 10 of the first embodiment shown in FIG. 1 was verified.

In the verification, oil-impregnated sintered bearings 10 as samples 1 to 4 shown in Table 1 below in which the area ratios of the Cu phase relative to the area of the inner circumferential surface S in the first region 3A were changed respectively were produced.

The sample 1 was obtained by using a powder mixture in which the entire mixing ratio was set to Fe-15 wt % Cu-2 wt % Sn, changing the blending ratio of Cu in the respective regions, introducing the powder mixture into a metal die, and sintering the powder mixture. The sample 2 was obtained by using a powder mixture in which the entire mixing ratio was set to Fe-20 wt % Cu-2 wt % Sn, changing the blending ratio of Cu in the respective regions, introducing the powder mixture into a metal die, and sintering the powder mixture. The sample 3 was obtained by using a powder mixture in which the entire mixing ratio was set to Fe-10 wt % Cu-1 wt % Sn, changing the blending ratio of Cu in the respective regions, introducing the powder mixture into a metal die, and sintering the powder mixture. The sample 4 was obtained by using a powder mixture in which the entire mixing ratio was set to Fe-1 wt % Cu-0.5 wt % Sn, changing the blending ratio of Cu in the respective regions, introducing the powder mixture into a metal die, and sintering the powder mixture.

The area ratios of the Cu phase relative to the areas of the inner circumferential surface S in the first regions 3A of the oil-impregnated sintered bearings 10 as the obtained samples 1 to 4 were The area ratios occupied by the Cu phase relative to the area of the inner circumferential surface S were obtained using the method described in the embodiment.

TABLE 1

| | Area ratio of Cu phase |
|---|---|
| Sample 1 | 0.5 |
| Sample 2 | 0.6 |
| Sample 3 | 0.25 |
| Sample 4 | 0 |

For the respective samples 1 to 4 described above, the friction coefficients were measured. In the measurement, a sliding test was carried out by rotating the rotary shaft 2 in a state in which a load was applied to the location of the central portion 3AS along the shaft line O of the first region 3A in the oil-impregnated sintered bearing 10 shown in FIG. 1, and the friction coefficient was computed. The measurement conditions are as described below.

1. Circumferential speed of rotary shaft 2: 100 m/min
2. Load: 1 MPa
3. Measurement environment temperature: Room temperature
4. Rotation time: 1800 seconds The results of the verification example 1 carried out under the above-described conditions are shown in Table 2 and FIG. 8.

TABLE 2

| | Friction coefficient |
|---|---|
| Sample 1 | 0.115 |
| Sample 2 | 0.110 |
| Sample 3 | 0.139 |
| Sample 4 | 0.155 |

Figure 8:
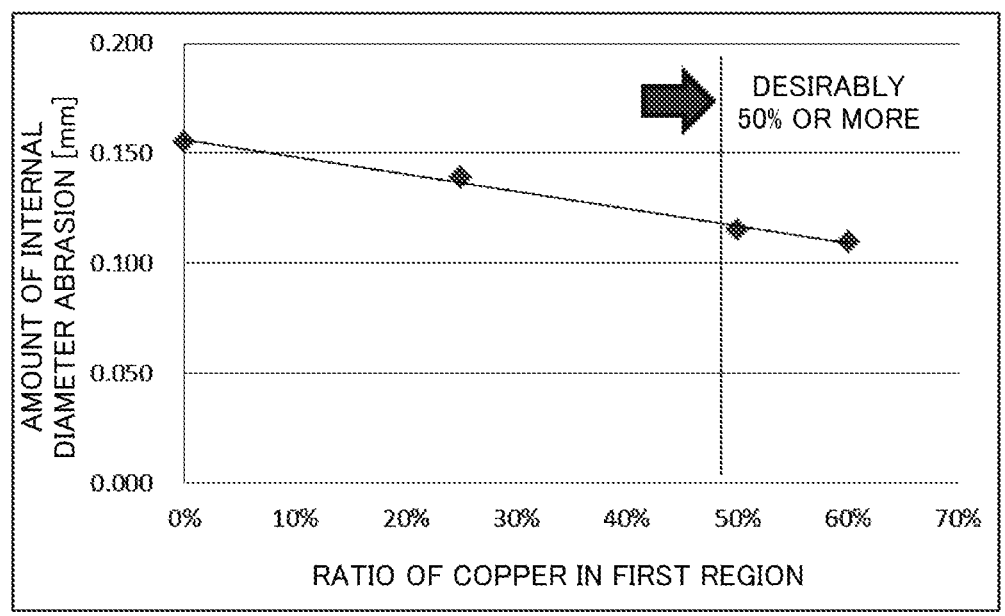
FIG. 8 is a graph showing results of an example.

According to the results of the verification example 1 shown in Table 2 and FIG. 8, it was confirmed that the friction coefficients of the sample 1 and the sample 2 were significantly lower than those of the sample 3 and the sample 4 and a strong effect of decreasing the friction coefficient could be obtained by setting the area ratio occupied by the Cu phase relative to the area of the inner circumferential surface S in the first region 3A of the oil-impregnated sintered bearing 10 shown in FIG. 1 to 50% or more.

Verification Example 2

A preferred ratio of the area ratio occupied by the Cu phase relative to the area of the inner circumferential surface S in the first region 3A (the first region (A) in Table 3) in the oil-impregnated sintered bearing 10 of the first embodiment shown in FIG. 1 was verified.

In the verification, oil-impregnated sintered bearings 10 as samples 5 to 9 shown in Table 3 below in which the area ratios of the Cu phase relative to the area of the inner circumferential surface S in the second region 3B (the second region (B) in Table 3) were changed respectively were produced.

The sample 5 was obtained by using a powder mixture in which the entire mixing ratio was set to Fe-60 wt % Cu-3 wt % Sn, changing the blending ratio of Cu in the respective regions, introducing the powder mixture into a metal die, and sintering the powder mixture. The sample 6 was obtained by using a powder mixture in which the entire mixing ratio was set to Fe-20 wt % Cu-2 wt % Sn, changing the blending ratio of Cu in the respective regions, introducing the powder mixture into a metal die, and sintering the powder mixture. The sample 7 was obtained by using a powder mixture in which the entire mixing ratio was set to Fe-25 wt % Cu-2 wt % Sn, changing the blending ratio of Cu in the respective regions, introducing the powder mixture into a metal die, and sintering the powder mixture. The sample 8 was obtained by using a powder mixture in which the entire mixing ratio was set to Fe-18 wt % Cu-2 wt % Sn, changing the blending ratio of Cu in the respective regions, introducing the powder mixture into a metal die, and sintering the powder mixture. The sample 9 was obtained by using a powder mixture in which the entire mixing ratio was set to Fe-1 wt % Cu-0.5 wt % Sn, changing the blending ratio of Cu in the respective regions, introducing the powder mixture into a metal die, and sintering the powder mixture.

The area ratios occupied by the Cu phase relative to the area of the inner circumferential surface S were obtained using the method described in the embodiment.

TABLE 3

|  | First region (A) | Second region (B) | [(B)/(A)] × 100 |
| --- | --- | --- | --- |
| Sample 5 | 0.9 | 0.9 | 100% |
| Sample 6 | 0.6 | 0.3 | 50% |
| Sample 7 | 0.7 | 0.4 | 57% |
| Sample 8 | 0.6 | 0.2 | 33% |
| Sample 9 | 0 | 0 | 0% |

For the respective samples 5 to 9 described above, the friction coefficients and the abrasion amounts were measured. In the measurement, a sliding test was carried out by rotating the rotary shaft 2 in a state in which a load was applied to a location 2 mm offset from the central portion 3AS along the shaft line O of the first region 3A in the oil-impregnated sintered bearing 10 shown in FIG. 1, and the friction coefficient was computed. The measurement conditions are as described below.

1. Circumferential speed of rotary shaft 2: 25 m/min
2. Load: 5 MPa
3. Measurement environment temperature: Room temperature
4. Rotation time: 1800 seconds The abrasion amounts were measured using a cylinder gauge.

Figure 9:
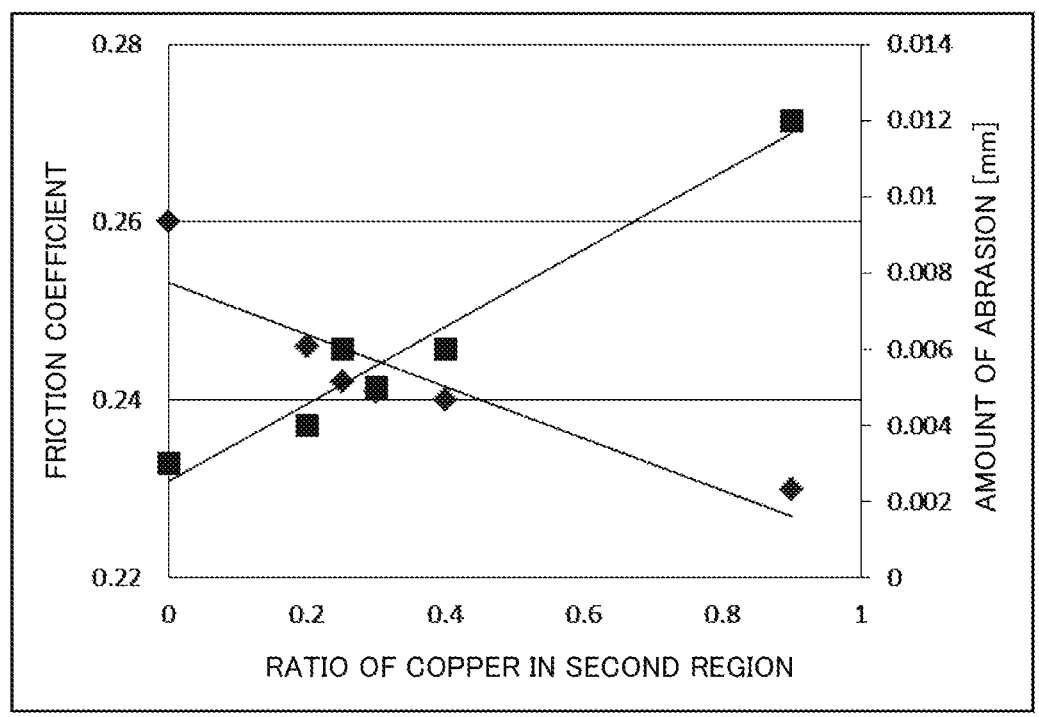
FIG. 9 is a graph showing results of an example.

The results of the verification example 2 carried out under the above-described conditions are shown in Table 4 and FIG. 9.

TABLE 4

|  | Friction coefficient | Abrasion amount (mm) |
| --- | --- | --- |
| Sample 5 | 0.23 | 0.012 |
| Sample 6 | 0.241 | 0.005 |
| Sample 7 | 0.24 | 0.006 |
| Sample 8 | 0.246 | 0.004 |
| Sample 9 | 0.26 | 0.003 |

According to the results of the verification example 2 shown in Table 4 and FIG. 9, as the area occupied by the Cu phase increases, the friction coefficient decreases, and the friction resistance can be decreased. On the other hand, it was confirmed that, as the area occupied by the Cu phase decreases, the abrasion resistance further improves.

Verification Example 3

In the oil-impregnated sintered bearing 20 of the second embodiment shown in FIG. 3, the ratio between the area occupied by the Cu phase in the straight hole portion 4a forming the first region 4A (the first region (A) in Table 5) and the area occupied by the Cu phase in the first diameter expansion portion 4b forming the second region 4B (the second region (B) in Table 5), and the relationship between the friction coefficient and the abrasion amount were verified.

In the verification, oil-impregnated sintered bearings 20 as samples 10 to 12 shown in Table 5 below in which the area ratios between the Cu phases in the straight hole portions 4a and the Cu phases in the first diameter expansion portions 4b were changed respectively were produced.

The sample 10 was obtained by using a powder mixture in which the entire mixing ratio was set to Fe-20 wt % Cu-2 wt % Sn, changing the blending ratio of Cu in the respective regions, introducing the powder mixture into a metal die, and sintering the powder mixture. The sample 11 was obtained by using a powder mixture in which the entire mixing ratio was set to Fe-25 wt % Cu-2 wt % Sn, changing the blending ratio of Cu in the respective regions, introducing the powder mixture into a metal die, and sintering the powder mixture. The sample 12 was obtained by using a powder mixture in which the entire mixing ratio was set to Fe-18 wt % Cu-2 wt % Sn, changing the blending ratio of Cu in the respective regions, introducing the powder mixture into a metal die, and sintering the powder mixture.

The area ratios occupied by the Cu phase relative to the area of the inner circumferential surface S were obtained using the method described in the embodiment.

TABLE 5

|  | First region (A) | Second region (B) | [(B)/(A)] × 100 |
| --- | --- | --- | --- |
| Sample 11 | 0.6 | 0.3 | 50% |
| Sample 12 | 0.7 | 0.4 | 57% |
| Sample 13 | 0.6 | 0.2 | 33% |

For the respective samples 10 to 12 described above, the friction coefficients and the abrasion amounts were measured. In the measurement, a sliding test was carried out by rotating the rotary shaft 2 in a state in which, in the oil-impregnated sintered bearing 20 shown in FIG. 3, a load was applied so that the rotary shaft was offset from the central portion 4AS along the shaft line O of the first region 4A and slidden in the diameter expansion portions 4b and 4c, and the friction coefficient was computed. The measurement conditions are as described below.

1. Circumferential speed of rotary shaft 2: 25 m/min
2. Load: 5 MPa
3. Measurement environment temperature: Room temperature
4. Rotation time: 1800 seconds The abrasion amounts were measured using a cylinder gauge.

Figure 10:
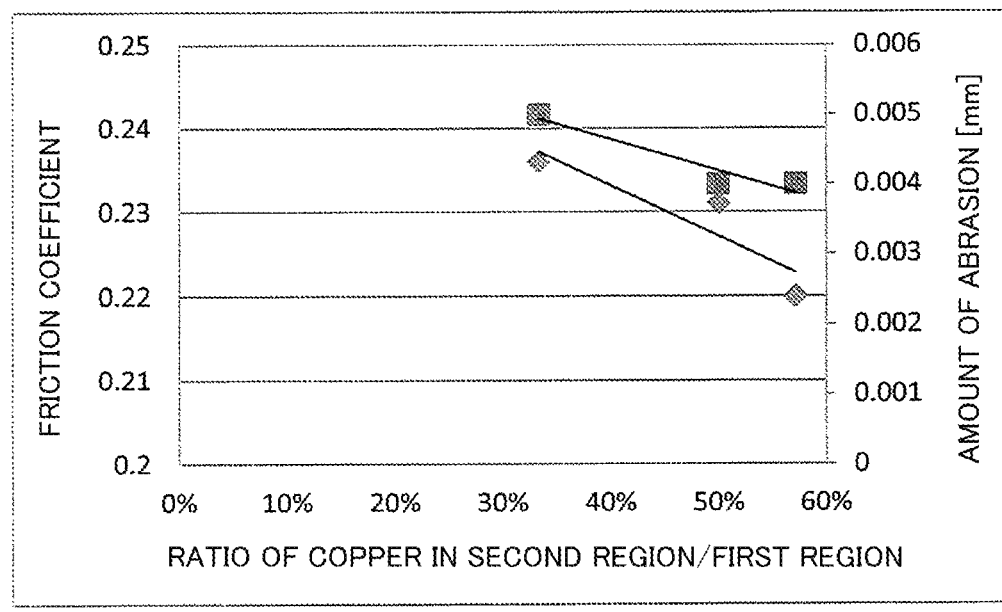
FIG. 10 is a graph showing results of an example.

The results of the verification example 3 carried out under the above-described conditions are shown in Table 6 and FIG. 10.

TABLE 6

|  | Friction coefficient | Abrasion amount (mm) |
|---|---|---|
| Sample 11 | 0.231 | 0.004 |
| Sample 12 | 0.22 | 0.004 |
| Sample 13 | 0.236 | 0.005 |

According to the results of the verification example 3 shown in Table 6 and FIG. 10, it was confirmed that, in a case where the rotary shaft 2 is rotated so as to be inclined, the friction coefficient can be decreased by increasing the area occupied by the Cu phase in the first diameter expansion portion 4b which the rotary shaft 2 comes into contact with.

REFERENCE SIGNS LIST

1, 11, 12 BEARING MAIN BODY (SINTERED BODY)
2 ROTARY SHAFT
3, 4 BEARING HOLE
3A, 4A FIRST REGION
3B, 4B SECOND REGION
3C, 4C THIRD REGION
3A1, 4A1 FIRST END PORTION
3A2, 4A2 SECOND END PORTION
3E1, 4E1 FIRST OPENING
3E2, 4E2 SECOND OPENING
3AS, 3BS, 4AS, 4BS CENTRAL PORTION
4a, 13a, 23a STRAIGHT HOLE PORTION
4b, 13b, 23b FIRST DIAMETER EXPANSION PORTION
13b1, 13c1 FIRST DIAMETER EXPANSION REGION
13b2, 13c2 SECOND DIAMETER EXPANSION REGION
4c, 13c, 23d SECOND DIAMETER EXPANSION PORTION
5 SCREW GEAR
10, 20, 30, 40 OIL-IMPREGNATED SINTERED BEARING (BEARING)
S, S1, S2, S3 FRICTION SURFACE
O SHAFT LINE

The invention claimed is:

1. An oil-impregnated sintered bearing comprising:
an Fe—Cu-based sintered body with a bearing hole that is configured to support a rotary shaft inserted therethrough,
wherein the Fe—Cu-based sintered body is impregnated with a lubricant,
an inner circumferential surface of the bearing hole includes at least a first region including a central portion in a shaft direction and a second region forming a portion from a first end portion of the first region to a first opening of the bearing hole, and
in a friction surface of the second region, an area of an Fe phase is larger and an area of a Cu phase formed of Cu powder including Cu-based flat raw material powder is smaller than those in a friction surface of the first region.

2. The oil-impregnated sintered bearing according to claim 1,
wherein the area of the Cu phase in the first region relative to an entire friction surface of the first region is 50% or more, and the area of the Cu phase in the second region relative to an entire friction surface of the second region is less than 50%.

3. The oil-impregnated sintered bearing according to claim 1,
wherein an area of the Cu phase in a central portion of the friction surface of the second region along the shaft direction is 20% or more and 70% or less of an area of the Cu phase in a central portion of the friction surface of the first region along the shaft direction.

4. The oil-impregnated sintered bearing according to claim 1,
wherein the inner circumferential surface of the bearing hole further includes a third region forming a portion from a second end portion of the first region to a second opening of the bearing hole.

5. The oil-impregnated sintered bearing according to claim 1,
wherein the bearing hole includes a straight hole portion that is formed in the first region and has a constant diameter and a first diameter expansion portion that is formed in the second region, continues from the straight hole portion, and has a diameter that increases outwards, to form a tapered shape.

6. The oil-impregnated sintered bearing according to claim 5,
wherein the inner circumferential surface of the bearing hole further includes a third region forming a portion of a second end portion of the first region to a second opening of the bearing hole, and
wherein the bearing hole further includes a second diameter expansion portion that is formed in the third region, continues from the straight hole portion, and has a diameter that increases outwards, to form a tapered shape.

7. The oil-impregnated sintered bearing according to claim 6,
wherein a taper angle of the first diameter expansion portion relative to the shaft direction is equal to a taper angle of the second diameter expansion portion relative to the shaft direction.

8. The oil-impregnated sintered bearing according to claim 6,
wherein a taper angle of the first diameter expansion portion relative to the shaft direction is different from a taper angle of the second diameter expansion portion relative to the shaft direction.

* * * * *